S. M. FORD.
METHOD OF MANUFACTURING PREPARED ROOFING.
APPLICATION FILED SEPT. 17, 1917.
1,268,105.
Patented June 4, 1918.
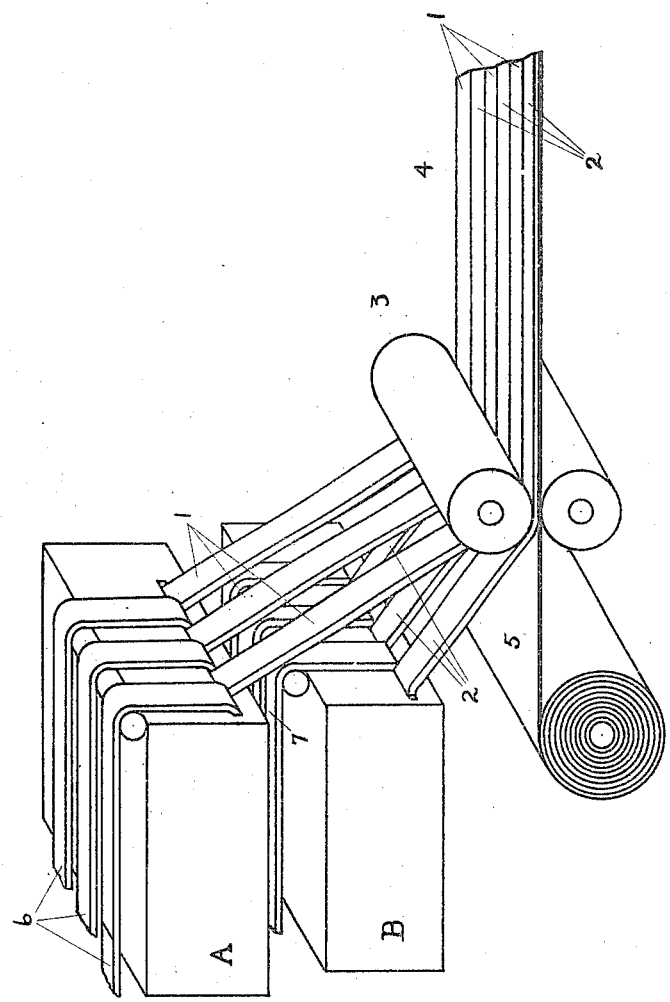
INVENTOR
Silas M Ford
by C. D. Enochs
ATTORNEY

UNITED STATES PATENT OFFICE.

SILAS M. FORD, OF ST. PAUL, MINNESOTA.

METHOD OF MANUFACTURING PREPARED ROOFING.

1,268,105.  Specification of Letters Patent.  Patented June 4, 1918.

Original application filed February 3, 1916, Serial No. 76,050. Divided and application filed October 6, 1916, Serial No. 124,185. Divided and this application filed September 17, 1917. Serial No. 191,884.

*To all whom it may concern:*

Be it known that I, SILAS M. FORD, a citizen of the United States, and a resident of St. Paul, in the county of Ramsey and State of Minnesota, have invented certain new and useful Improvements in Methods of Manufacturing Prepared Roofing, of which the following is a specification.

This application refers to a method of manufacturing prepared roofing, and is a divisional of my co-pending application bearing the same title, Serial No. 124,185, filed October 6, 1916, which, in turn, was a divisional of my co-pending case, Ser. No. 76050, filed Feb. 3, 1916, of the same title.

The object of this invention is to provide a method of forming a striped roofing through certain methods of combining multi-colored strips, together with other objects incidental thereto.

The drawing shows, in isometric projection, a method of combining strips taken from two different sheets to form one or two sheets of striped roofing.

A considerable quantity of prepared roofing is used at the present time in making design roofs, either as a design on the roofing sheet or marked by colors, or otherwise, so as to form designs when the sheets are cut in the shingle strips or unit shingles, and my method of manufacturing is especially applicable to this line of the art.

In the drawing, A and B represent machines for producing a composition as described in my co-pending application, being shown merely in conventional style in the drawing, and the two composition sheets produced by the machines A and B are slit by circular knives, or other suitable means, the result being strips of water-proof compound sheets, and as each of the sheets may be of a different color, the strips slit from the sheet formed by machine A may be red, for instance, while the strips formed by the machine B may be blue.

The strips 1 produced by the machine A, and the strips 2 produced by the machine B, are then combined by means of rollers 3 to form a striped sheet 4 in which the strips 1 would be red and the strips 2 would be blue.

A sheet of foundation stock 5, prepared in any suitable manner, is joined to the strips at the rollers 3, and the strips, when so joined, are still sufficiently sticky to amalgamate with the sheet 5, and also to amalgamate with each other at their edges.

It is evident that the remaining strips 6 from the machine A, and the strips 7 from the machine B, may be extended as shown and joined by another pair of rollers, similar to the rollers 3, to form a second sheet of striped roofing, similar to the sheet 4.

By making shingle strips from this striped roofing I obtain a desirable color effect for roofing purposes, and this can be worked out in numerous ways, as can be readily understood by those skilled in the art.

It is also evident that the manner of slitting, and the relative size of the resultant strips may be varied, and that any number of colors may be combined in this manner.

While in describing my method, I have set up a certain series of operations and shown a specific type of machine, I do not wish it understood that I limit myself in this manner, as it is evident that the invention may be varied in many ways within the scope of the following claims.

Claims:

1. The method of making prepared roofing, comprising the making of a sheet of water-proof material by depositing on heat resisting endless belts, water-proof compound of different colors, scraping them to the desired thickness, freeing the sheets so formed from the belts, slitting the sheets so formed into strips, joining parts of the strips from each sheet onto a sheet of separately prepared foundation stock so as to form therewith a striped roofing design, the edges of the strips so joined being amalgamated in the process of joining.

2. The method of manufacturing prepared roofing, comprising the forming of a number of sheets of different colored water-proof material, comprising the depositing of different colored water-proof compounds on a moving surface, cooling the water-proof compound, and removing the strips so formed from the surface, and joining the striped sheet of water-proof compound so formed to a foundation sheet.

8. The method of manufacturing striped roofing material, whereby two sheets of water-proof material of different colors are formed, each of said sheets cut into strips, and alternate strips from each sheet joined to two foundation sheets so as to form therewith two sheets of striped roofing material.

SILAS M. FORD.